3,520,710
SPRAY DRYING OF TITANIUM DIOXIDE
Larry E. Kniffin, Wilmington, Del., assignor to E. I. du Pont de Nemours and Company, Wilmington, Del., a corporation of Delaware
No Drawing. Filed July 19, 1967, Ser. No. 654,330
Int. Cl. B02c *19/06;* C09c *1/36, 3/00*
U.S. Cl. 106—300                         4 Claims

ABSTRACT OF THE DISCLOSURE

Preparation of titanium dioxide pigments suitable for use in emulsion paint by adding 0.1 to 1.0% by weight (based on the weight of $TiO_2$) of a trialkanolamine to an aqueous $TiO_2$ slurry and thereafter spray drying.

FIELD OF THE INVENTION

This invention relates to a novel method for preparing titanium dioxide pigments. More particularly, it relates to an improved process for producing titanium dioxide pigment useful in emulsion paints whereby a water slurry of the titanium dioxide pigment is treated with an alkanolamine dispersing agent and the treated slurry is spray dried. As an alternative, the treated spray dried pigment can then be ground in a fluid energy mill and the resulting pigment has improved gloss and dispersibility.

The process of the present invention can be applied to titanium dioxide pigment produced by either the sulphate or chloride process. Although both crystalline forms of titanium dioxide, anatase and rutile, will have their pigmentary properties improved by the proposed method, the invention is particularly applicable to the rutile form of titanium dioxide produced by the vapor phase oxidation of $TiCl_4$.

In this chloride process an oxygen-containing gas is reacted with titanium tetrachloride. Pigmentary $TiO_2$ is directly obtained, but because of the gritty material in this product, further treatments must be applied. In some cases the chloride type pigment is subjected to wet treatment where minor amounts of agents are added, and the resulting slurry is filtered, dried and then micronized in order to remove the coarse aggregates.

The proposed invention enables one to eliminate the final milling or micronizing step and produce a $TiO_2$ pigment useful in emulsion paints. However, if the final milling step is included, i.e., if the treated spray dried pigment is ground in a fluid energy mill (as described in U.S. Pat. No. 3,178,121), measurable improvements of pigmentary properties, namely gloss and dispersion, are obtained.

SUMMARY OF THE INVENTION

According to the present invention a process is provided for preparation of titanium dioxide pigments suitable for use in emulsion paints, which pigments possess good emulsion hiding power and low abrasiveness which comprises adding to a slurry of a titanium dioxide pigment in water, 0.1 to 1.0 percent by weight, based on the weight of the pigment, of a trialkanolamine, preferably triethanolamine, followed by spray drying of the treated slurry. Dispersion and gloss of the pigment are measurably improved by grinding the treated spray dried pigment in a fluid energy mill.

In a more specific embodiment of this invention, a titanium dioxide pigment prepared by the chloride process described in U.S. Pats. Nos. 2,791,490 (O. B. Wilcox) and 2,559,638 (I. J. Krchma and H. H. Schumann) is subjected to wet treatment where minor amounts of agents are added. The wet treated pigment is then filtered and washed to remove residual salts. The filtered pigment is then slurried in water to produce a slurry having a pigment concentration of 40 to 60 percent by weight. Triethanolamine is added as a 50 percent water solution to the pigment slurry, the amount of triethanolamine added ranging from 0.1 to 1.0 percent by weight, preferably 0.2 to 0.6 percent by weight, based on the weight of the $TiO_2$ in the slurry. The triethanolamine treated slurry is then fed to a spray dryer where the slurry is atomized into a high temperature gas zone. Any one of a number of methods may be used to atomize slurries in spray dryers. A spray dryer manufactured by the Bowen Engineering Company utilizes a spinning disk atomizer wherein the slurry is broken up by discharging it at high velocity from the periphery of a rapidly rotating disk. The atomized droplets are discharged into a high temperature air zone, where they are dried by rapid evaporation of the liquid or water portion of the slurry and the dried particles are discharged from the spray dryer. The inlet temperature of the hot air to the spray dryer is about 500° C.

At this point, there are two alternatives: (1) the triethanolamine treated spray dried pigment can be conveyed directly to the pigment packers where it is packed in bags and readied for shipment, or (2) the treated spray dried pigment can be conveyed to a fluid energy mill, such as a micronizer, and ground with a relatively low steam to pigment ratio, that is, the ratio of pounds of steam to pounds of pigment is in the range 0.5:1 to 2:1, followed by packing of the ground pigment in bags.

In the case where the pigment is ground in a micronizer, it is found that comparable gloss and dispersion can be obtained by grinding at a lower steam to pigment ratio when triethanolamine is used as a treating agent.

Other trialkanolamines having molecular weights varying from about 107 to about 233 such as trimethanolamine, tripropanolamine, and tributanolamine are also useful in the process, but triethanolamine is preferred. Commercial triethanolamine contains, in addition to 80 to 85% triethanolamine, about 15% of diethanolamine, and 1.0 to 2.5% of monoethanolamine; purified trietanolamine is satisfactory.

The triethanolamine is added to the pigment slurry prior to the spray drying either without dilution or as a water solution in concentrations as low as 5% thiethanolamine.

Whereas the preferred embodiment of this invention utilizes a spray dryer having a spinning disk atomizer to break up the slurry into droplets, otherwise known as centrifugal atomization, other methods of atomizing the slurry may be used. Spray dryers using pressure atomization wherein the energy to break up the slurry is provided by high pressure pumping equipment may also be used. In pressure atomization a small orifice nozzle is used to produce a narrow range of sprayed droplet sizes. Still another method of atomizing the slurry that can be used is known as pneumatic (or two-fluid) nozzle atomization. In this latter method atomization is caused by means of two impinging jets.

DEFINITIONS AND STANDARDS

"Gloss" as reported herein is determined in accordance with ASTM D–523, "20° Specular Gloss." "Dispersion" refers to the movement of wetted particles into the body of the liquid vehicle to effect a permanent particle separation (Paint Flow and Pigment Dispersion by T. C. Patton, p. 217). Two types of dispersion tests are used to grade samples of the invention. One, referred to as the Hegman dispersion is determined in accordance with ASTM D–1210, "Fineness of Grind." The second method is referred to as the Cowles Flow Out Dispersion test. In this test, flow-out of paint, prepared as described in ASTM D–1210, is made on aluminum panels, inclined one inch from the horizontal, by allowing a mixture of the paint diluted with varsol (paint thinner) to flow down the panel. The panels are baked and compared with standards. In this test pigment particles that have not been finely dispersed show up. As the mixture flows down the panel, smaller particles remain at the top in the thinner part of the film while large particles flow down to the lower part of the panel and can be observed in this portion of the film. By comparing the flowout panels of the samples of this invention with standards of known dispersion, rated from 0 to 10 with 10 being the best dispersion, numerical value is assigned to the samples.

The "abrasion" test is designated to determine the abrasiveness of a pigment. Because of its sensitivity, this test is suitable for testing pigments to be used in printing inks, e.g., inks for rotogravure printing. A 30 gram sample of pigment is combined with 70 grams of a vehicle comprising 4% ethyl cellulose, 87% butyl Carbitol acetate, and 9% toluene and ground on a ball mill for two hours. A piece of glass (with the size and shape of a microscope slide) that has been chrome plated to produce a partially mirrored surface is placed in a Colormaster and its transmittance measured. This is a stock item purchased from a supplier and normally has a transmittance value of approximately 30%. The chrome plated mirror is placed in an ink tray with the chrome plated side facing up. A sufficient amount of the ground paint is poured into the tray to cover the chrome plated mirror. A felt covered rubbing finger is placed on the mirror and a rubbing cycle of 200 strokes is completed. The mirror is removed from the paint, cleansed and the transmittancy of the abraded mirror is measured. The transmittance increase is calculated: Transmittance increase=Transmittance (after abrasion) −Transmittance (before abrasion). The grittier the pigment, the higher the transmittance increase, because more of the mirror's surface will be abraded or removed. In a series of samples relative abrasion is usually reported. The transmittance increase of the standard, or control, is assigned a value of 100 as its abrasiveness number, the abrasiveness of the sample of this invention is calculated relative to the control.

The "hiding power" of an emulsion paint is the ability of a water base or water dispersible paint to obsecure the background over which it is applied. A 200 gram sample of pigment produced by this invention is combined with 135 grams of magnesium silicate, 50 grams of aluminum silicate, and 30 grams of diatomaceous earth. This pigment composite is added to 280 grams of an emulsion type vehicle comprising 77% by weight of water, and the remainder of the vehicle is made up of diethylene glycol monoethyl ether, a dispersing agent, and an antifoamer, and a wetting agent. This combination of pigment and vehicle is ground in a high speed stone mill, then thoroughly mixed with 450 grams of a reduction vehicle comprising 62% by weight of polyvinyl acetate emulsion, 34% by weight of hydroxyethyl cellulose solution (2%), and 4% by weight of distilled water. Drawdowns of the resultant paint are made on standard hiding power charts using a 0.004 inch clearance blade. Reflectance readings are determined on the dried paint film over the white and black portions of the hiding power chart. Contrast ratios are calculated by substituting into the following formula:

$$C/R \text{ (Contrast Ratio)} = \frac{\text{Ave. Reflectance of Coating Over Black Area}}{\text{Ave. Reflectance of Coating Over White Area}}$$

A control pigment is prepared by the same method and arbitrarily assigned a hiding power value of 100. By comparing the contrast ratios of the control pigment with the sample pigment, a relative numerical value is assigned to the sample.

For the hiding power tinting strength test, 100 grams of the emulsion paint prepared for the hiding power test is placed in a jar with 5/64 of an ounce of "Pittsburgh Plate Glass Maestro Universal Colorant (Phthalo Blue)." The color is thoroughly mixed into the paint. Again drawdowns are made, but this time on blank white lacquered panels using a 0.008 inch clearance blade. A paint film of the thickness produced by this clearance blade should produce a reflectance known as $R_\infty$—that is, the reflectance of a film so thick that a further increase in thickness does not change the reflectance. Reflectance measurements of the paint film are made using a Colormaster. A table has been compiled that gives the ratio of absorption coefficient to scattering coefficient $(K/S)$ as a function of reflectance $(R_\infty)$. A control pigment is prepared and tested in the same manner and arbitrarily assigned a tinting strength value of 100. Then by substituting values into the following formula, the tinting strength hiding power of the sample is determined:

Tinting Strength Hiding Power (Sample)
$$= \frac{K/S \text{ Standard} \times 100}{K/S \text{ Sample}}$$

The following examples illustrate the invention but should not be considered as limitations thereof.

EXAMPLE 1

Two thousand parts by weight of titanium dioxide produced by the vapor phase oxidation process described in U.S. Pats. 2,791,490 (O. B. Willcox) and 2,559,638 (Krchma and Schaumann) is wet treated with hydrous oxides of titania and alumina, filtered, washed, then slurried in water to provide a pigment concentration of 50%. Eight parts by weight of triethanolamine are added to the slurry in the form of a 50% triethanolamine-water solution. This slurry is fed to a Bowen Engineering Spray Dryer where the slurry is dried with hot air, inlet temperature of the air being 500° C., and the outlet temperature of the air being 105° C. The dried pigment is sampled and tested with results as reported below compared with a control pigment prepared by the same process. However, the control pigment is spray dried with no triethanolamine added and then is micronized.

| Sample | Emulsion Hiding power | Emulsion tinting strength | Abrasiveness |
|---|---|---|---|
| Ex. 1 | 119 | 112 | 91 |
| Control | 100 | 100 | 100 |

EXAMPLES 2 THROUGH 6

Five samples, each 2000 parts by weight of titanium dioxide, are prepared by the same process described in Example 1. These samples are spray dried, then micronized at different steam to pigment ratios. Examples 2, 3 and 4 are treated with 8 parts by weight of triethanolamine. Examples 5 and 6 are comparative controls.

| Sample | Triethanolamine, percent added | Steam/pigment ratio | Gloss |
|---|---|---|---|
| Ex. 2 | 0.4 | 1.3 | 75 |
| Ex. 3 | 0.4 | 1.8 | 78 |
| Ex. 4 | 0.4 | 2.3 | 79 |
| Ex. 5 | | 1.8 | 72 |
| Ex. 6 | | 2.3 | 75 |

As the results show, it is possible to grind the pigment at a lower steam-to-pigment ratio and obtain comparable gloss when triethanolamine is added to the slurry fed to the spray dryer.

EXAMPLES 7 THROUGH 10

Four samples, each 2000 parts by weight of titanium dioxide, are prepared by the same process as described in Example 1. These samples are treated with varying amounts of triethanolamine, spray dried, then micronized with the following results in gloss and dispersion.

| Sample | Triethanol-amine, percent added | Steam/pigment ratio | Gloss | Dispersion (Cowles F.O.) |
|---|---|---|---|---|
| Ex. 7 |  | 1.6 | 71 | 8 |
| Ex. 8 | 0.2 | 1.9 | 76 | 9 |
| Ex. 9 | 0.4 | 1.9 | 76 | 9 |
| Ex. 10 | 0.6 | 2.0 | 78 | 9 |

Examples 8, 9 and 10 all show improvements in gloss and dispersion over the comparative control sample, Example 7.

EXAMPLES 11 AND 12

Two samples each 2000 parts by weight of titanium dioxide are prepared by the process outlined in Example 1. Example 11 is not treated with triethanolamine, whereas Example 12 is treated with 8 parts by weight, based on the weight of the pigment with triethanolamine. Otherwise the finishing operations are identical. The slurries are spray dried and the dried pigment micronized in a fluid energy mill with the following results.

| Sample | Triethanol-amine, percent added | Steam/pigment ratio | Gloss | Dispersion (Hegman) |
|---|---|---|---|---|
| Ex. 11 |  | 3.0 | 70 | 5 |
| Ex. 12 | 0.4 | 3.0 | 76 | 7 |

Many equivalent modifications of the present invention will become apparent to those skilled in the art from a reading of the above without a departure from the inventive concept.

What is claimed is:

1. In a process for the preparation of titanium dioxide pigments suitable for use in emulsion paints, said pigments possessing good emulsion hiding power and low abrasiveness the improvement consisting essentially of the combination of the steps of (1) adding from 0.1 to 1.0 percent by weight, based on the weight of the said titanium dioxide pigment, of trialkanolamine, to a slurry of titanium dioxide pigment in water, (2) spray drying the resulting slurry and (3) recovering the finished titanium dioxide pigment having good emulsion hiding power and low abrasiveness.

2. A process as in claim 1 in which the trialkanolamine is triethanolamine and is added to the slurry in an amount from 0.2 to 0.6 percent by weight.

3. In a process for improving the gloss and dispersion properties of titanium dioxide pigments by treating the pigment with a trialkanolamine, drying the treated pigment and grinding the treated pigment in a mill the improvement consisting essentially of treating the pigment by adding from 0.1 to 1.0 percent by weight, based on the weight of the said titanium dioxide pigment, of triethanolamine, to a slurry of titanium dioxide pigment in water, drying the treated pigment by spray drying the resulting slurry, and grinding the treated and spray dried pigment by grinding the dry titanium dioxide pigment in a fluid energy mill at a steam to pigment ratio in the range 1:1 to 3:1.

4. A process as in claim 3 in which the amount of triethanolamine added to the slurry is from 0.2 to 0.6 percent by weight.

References Cited

UNITED STATES PATENTS

| | | |
|---|---|---|
| 2,721,787 | 10/1955 | Hettrick. |
| 2,737,460 | 3/1956 | Werner _____ 106—300 |
| 2,744,029 | 5/1956 | Kingsbury _____ 106—300 |
| 3,015,573 | 1/1962 | Myers et al. _____ 106—300 |
| 3,372,043 | 3/1968 | Fanselon _____ 106—309 XR |
| 3,412,944 | 11/1968 | Wollenberg _____ 106—300 XR |
| 3,418,147 | 12/1968 | Fields. |

TOBIAS E. LEVOW, Primary Examiner

H. M. SNEED, Assistant Examiner

U.S. Cl. X.R.

106—308; 241—5